Nov. 26, 1963 W. MESSERSCHMITT 3,112,102
TELESCOPIC STRUT
Filed Nov. 2, 1961 2 Sheets-Sheet 1
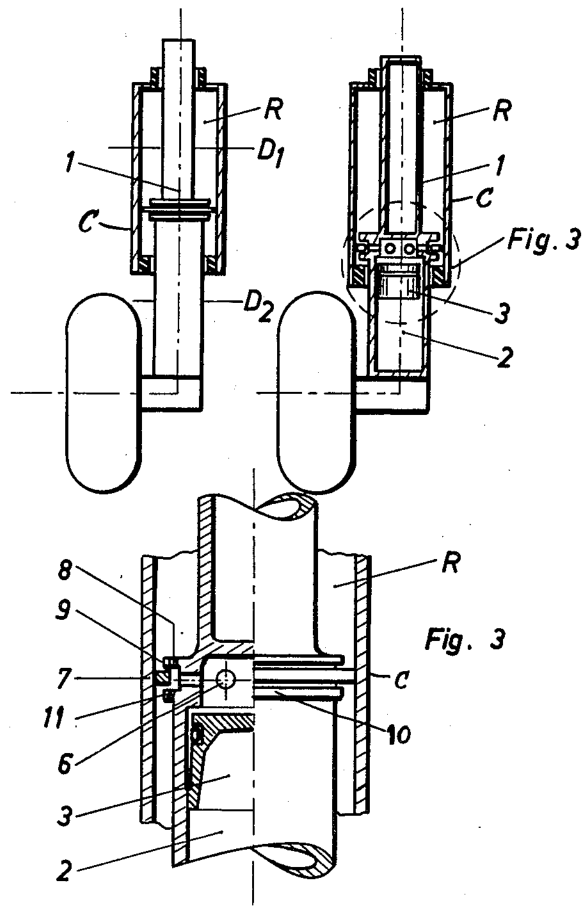
W. MESSERSCHMITT
INVENTOR.
BY Moore & Hall
ATTORNEYS.

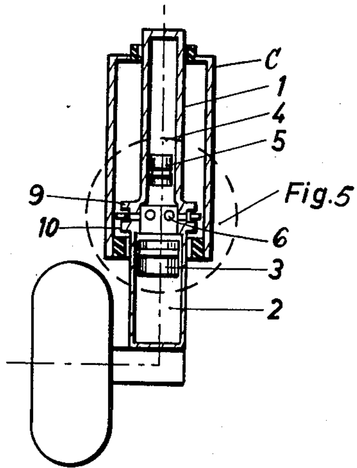
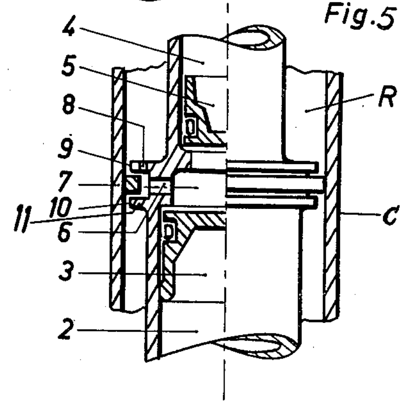
W. MESSERSCHMITT
INVENTOR.
BY Moore & Hall
ATTORNEYS.

United States Patent Office 3,112,102
Patented Nov. 26, 1963

3,112,102
TELESCOPIC STRUT

Willy Messerschmitt, Munich, Germany, assignor to Messerschmitt AG., Augsburg, Germany, a company of Germany Filed Nov. 2, 1961, Ser. No. 149,764
3 Claims. (Cl. 267—64)

This invention relates to telescopic struts more particularly for aeronautical purposes.

Telescopic struts, particularly for aircraft, are generally of a construction comprising a piston rod at the bottom end of which is disposed an axle for a landing wheel or wheels, and which is mounted in a cylinder.

The telescopic shock course is governed by the length of piston rod that can be inserted in the cylinder.

To enable bending forces to be taken into account, it is necessary for the piston rod to be mounted in two bearings in the cylinder. To avoid any jamming, these bearings should not be situated too close together, i.e., there must be a certain "span" which corresponds to the length of the strut deflection.

The total length of the telescopic strut thus consists of dead lengths, such as lengths required for sealing purposes, piston height, axle height, and so on, to which must be added twice the length for the spring, and the aforesaid span.

The span is generally not made less than the spring length, so that as far as possible the strut length is made three times the length of the spring, to which the dead lengths must also be added.

These telescopic struts frequently become excessively long, particularly in aircraft without propellers, and this quite definitely has an adverse effect on their accommodation in the wing of high-speed aircraft having thin wing units.

To render the telescopic strut of a smaller overall length, a resilient member or a compressible medium is provided in the cylinder, and the piston rod is not only mounted in the bottom end of the cylinder but is extended in such manner as to pass through the cylinder cover at the top and it is also supported in a bearing at the top.

The present invention has for its object to provide an improved telescopic strut particularly for aeronautical purposes; and to this end the telescopic strut has a piston rod mounted not only at the bottom of the cylinder but extended so as to pass through the cylinder cover at the top and passing through a bearing at the top, the upper part of the piston rod being of smaller diameter than the bottom part.

The invention will now be described with reference to the accompanying drawings which illustrate preferred embodiments thereof by way of example, and in which:

FIG. 1 shows a telescopic strut in which the upper piston rod is of lesser diameter than the bottom rod;

FIG. 2 shows a telescopic strut with a hollow bottom piston rod and a separating piston;

FIG. 3 shows part of FIG. 2 illustrating the position of connecting ducts;

FIG. 4 shows a telescopic strut wherein the bottom and the top hollow piston rods are used for suspension purposes; and FIG. 5 shows a part of FIG. 4.

The continuous piston rod 1 is shown in FIG. 1, disposed within a cylinder C, and so contructed as to include a first or lower piston rod part $D_2$ and a second or upper piston rod part $D_1$. The top part $D_1$ of the piston rod situated above the piston has a smaller diameter than the bottom part $D_2$ of the piston rod. The opposing ends of piston rod 1 pass through the opposite ends of cylinder C, as indicated, and are associated at said opposite cylinder ends with appropriate bearing means, as also indicated in FIGURES 1, 2, and 5.

The difference in the volume of the cross-sectional areas of the two piston rod parts, times the stroke, gives a volume difference which can be utilized for a suspension. For this purpose a substantially incompressible fluid medium may be provided, which fills the annular space R, and the difference in volume of fluid on the two sides of the piston is forced into another chamber which, for example, may be either filled with compressed air or provided with spring-loaded pistons.

FIG. 2 illustrates a simple solution of this kind. Use is made of an auxiliary or second separating piston 3 which is resiliently loaded by compressed air or by some other suspension means (see FIG. 3), and which is situated in the first or bottom hollow part 2 of the piston rod 1. Due to difference in the volume of the fluid, the fluid flows through connecting ducts 6 from the annular space to the spring chamber 2. The ducts 6 advantageously are made so small as to have a throttling action. This results in a speed-dependent damping effect.

Since in telescopic struts the damping on the return movement is usually required to be much more effective than the damping on an outgoing movement, a slidably movable non-return ring 7 is provided, adjacent the inner walls of the cylinder C, between piston rod collars 9 and 10, each of which piston rod collars is, as illustrated, spaced from the inner walls of cylinder C. The variation of the damping action due to movement of the non-return ring 7 relative to collars 9 and 10 takes place as follows:

When the telescopic strut moves inwards, the non-return ring 7 slides downwardly and is pressed against the bottom piston-rod collar 10 so that the medium flowing into the interior of the piston can flow through the throttle bores 8 to ducts 6; and also, past the outer edge of collar 9, through the intermediate space between the non-return ring 7 and the top piston-rod collar 9, to said ducts 6.

The telescopic strut, on the other hand, is damped more considerably during an outgoing or extending movement thereof, since, during this reverse motion operation, the non-return ring 7 moves upwardly and bears against the top piston-rod collar 9 so as to close the flow space between cylinder C and the outer edge of collar 9. In this condition of operation, therefore, the fluid medium can flow only through the bores 8 in the annular space R. If it proves necessary, moreover the non-return ring 7 may be made with a width such that on the return movement some of the bores 8 are covered whereby the cross-section for the fluid flow is reduced even further.

The variation in damping during the back and forth movement of the piston rod 1 within the cylinder or compression strut C is thus due to the action of the ring 7. This ring will abut the lower piston rod collar 10 during an inward stroke, and will abut the upper piston rod collar 9 during an outward stroke. The entire space R is always completely filled with the substantially incompressible flow medium or fluid. Upon occurrence of an inward stroke, the displaced fluid will flow through the throttling bores 8 as well as through the open gap between ring 7 and the upper piston collar 9 (since ring 7 is, at this time, spaced from collar 9); and the difference of the displaced volume will then flow through the connecting ducts 6 into the strut area above the resiliently loaded second or auxiliary piston 3, and will also flow through equalizing ducts 11 in collar 10 to the annular area surrounding the lower piston rod below the first piston 7, 10. The difference of the displaced volume can be defined as the volume which, at the inward stroke of the piston rod, cannot be accommodated by the annular area below said first piston 7, 10. Upon occurrence of an outward stroke, the fluid which is present in the strut area above the second or auxiliary piston 3 will flow into the annular area R, first through the connecting ducts 6 and then through the throttling bores 8. The profile of the flow-through area, during this outward stroke, is now reduced in size, however, because the ring 7 is at this time in abutment with the upper piston collar 9, thereby closing the previously open gap. In this manner, the invention accomplishes the increase in the outward stroke damping; the increase in outward stroke damping being brought about by the difference in fluid flow through ducts 8 on the outward stroke, and equalizing ducts 11 in collar 10 on the inward stroke, together with the described action of ring 7 relative to the collars 9 and 10.

FIGS. 4 and 5 show a telescopic strut which is identical in principle; they differ from one another only in that the hollow top piston-rod half 4 also includes an auxiliary piston 5, similiar to auxiliary piston 3, whereby said top half 4 is also used for suspension. This gives a stepped load diagram.

I claim:

1. A telescopic strut particularly for aeronautical purposes comprising a generally vertically oriented cylinder, a substantially incompressible fluid therein, a piston in said cylinder, a hollow first piston rod on the underside of said piston extending through the lower end of said cylinder for connection to a landing wheel, and an auxiliary piston in said hollow piston rod, means in said hollow piston rod for resiliently loading said auxiliary piston in an upward direction, a second piston rod on the upper side of said piston extending through the upper end of said cylinder, said second piston rod being of lesser diameter than the first piston rod on the underside of said piston, collar means carried by said piston between said first and second piston rods, said collar means having its outermost edge spaced from the inner walls of said cylinder, duct means including a portion adjacent said collar means for passing fluid in a first direction from a region adjacent said second piston rod to a region adjacent the upper side of said auxiliary piston when said said strut telescopes in a first direction, said duct means comprising orifices in said collar means, said duct means portion further comprising the space between said collar edge and said cylinder and abutment means movable relative to said collar means and positioned to selectively close at least said space between said collar edge and said cylinder thereby to restrict the flow of said fluid through said duct means from the region adjacent the upper side of said auxiliary piston during telescoping of said strut in a second direction opposite to said first direction whereby said strut moves in said second direction with a higher degree of damping than in said first direction.

2. The structure of claim 1 wherein said abutment means comprises a ring slidably movable within said cylinder.

3. A telescopic strut particularly for aeronautical purposes comprising a cylinder, a substantially incompressible medium therein, a piston in said cylinder, a hollow first piston rod beneath said piston extending from the cylinder, said piston having a first collar thereon adjacent said first piston rod, a second piston rod above said piston extending from the cylinder and of lesser diameter than said first piston rod, said piston having a second collar thereon adjacent said second piston rod and spaced from said first collar, duct means in both said collars for effecting a flow of said incompressible medium from a region surrounding said second piston rod to a region surrounding said first piston rod as well as to a region within said hollow first piston rod upon movement of said piston in a first direction thereby to effect a damped movement of said piston in said first direction, and ring means disposed between said collars and slidably movable relative to said cylinder for restricting portions of said duct means communicating the interior of said hollow first piston rod with the region surrounding said second piston rod upon movement of said piston in a second direction opposite to said first direction whereby movement of said piston in said second direction is damped to a greater extent than movement thereof in said first direction.

References Cited in the file of this patent

UNITED STATES PATENTS

| | | |
|---|---|---|
| 2,363,485 | Down | Nov. 28, 1944 |
| 2,564,790 | Orloff et al. | Aug. 21, 1951 |
| 2,771,968 | Mercier | Nov. 27, 1956 |
| 2,960,289 | Westcott | Nov. 15, 1960 |

FOREIGN PATENTS

| | | |
|---|---|---|
| 740,504 | Germany | Oct. 22, 1943 |
| 531,168 | Great Britain | Dec. 31, 1940 |
| 709,340 | Great Britain | May 19, 1954 |